US012794565B2

(12) United States Patent
Plotnikov

(10) Patent No.: US 12,794,565 B2
(45) Date of Patent: Nov. 10, 2026

(54) INSTANTANEOUS COMMUNICATION USING VIRTUAL PHOTONS IN A SYSTEM OF TWO COHERENT PARTICLES AND METHODS THEREOF

(71) Applicant: Dmitriy Plotnikov, Hillsborough, NJ (US)

(72) Inventor: Dmitriy Plotnikov, Hillsborough, NJ (US)

( * ) Notice: Subject to any disclaimer, the term of this patent is extended or adjusted under 35 U.S.C. 154(b) by 165 days.

(21) Appl. No.: 18/655,519

(22) Filed: May 6, 2024

(65) Prior Publication Data

US 2024/0372629 A1 Nov. 7, 2024

Related U.S. Application Data

(60) Provisional application No. 63/464,196, filed on May 5, 2023.

(51) Int. Cl.
*H04B 10/70* (2013.01)
*G02B 27/28* (2006.01)

(52) U.S. Cl.
CPC .......... *H04B 10/70* (2013.01); *G02B 27/281* (2013.01); *G02B 27/288* (2013.01)

(58) Field of Classification Search
CPC .... H04B 10/70; G02B 27/281; G02B 27/288; G02B 6/34; G02B 27/283; G02B 27/28; G02B 27/42; G02B 27/4205; G02B 27/44
See application file for complete search history.

(56) References Cited

U.S. PATENT DOCUMENTS 5,488,681 A 1/1996 Deacon et al.
5,491,762 A 2/1996 Deacon et al.
(Continued)

FOREIGN PATENT DOCUMENTS

CN 1157659 A 8/1997
CN 1158671 A 9/1997
(Continued)

OTHER PUBLICATIONS

Jaeger; "Are Virtual Particles Less Real?", Entropy, vol. 21, Issue No. 2, Feb. 2019, pp. 17, https://www.mdpi.com/1099-4300/21/2/141.
(Continued)

*Primary Examiner* — Hibret A Woldekidan
(74) *Attorney, Agent, or Firm* — Gearhart Law LLC

(57) ABSTRACT

The described apparatus comprises a laser, a diffraction grating, two polaroid filters, and a receiving antenna. This setup allows a photon to be separated into two coherent quantum energy states by simultaneously passing through two slits. The exchange between these coherent quantum states results in the formation of a virtual photon bearing a set of discrete energy points in space. In a first operational mode, the unencoded photon emitted by the laser is encrypted by changing the photon's intensity using two polaroid filters and then converted into two coherent states using a diffraction grating, instantly transmitting information from the grating output to the receiving antenna. In a second operational mode, the encoded signal from the electromagnetic wave transmitter hits the diffraction grating, is converted into two coherent quantum states, and instantly transmits the signal (information) from the grating's output to the receiving antenna.

11 Claims, 25 Drawing Sheets

(56) References Cited

U.S. PATENT DOCUMENTS

| | | | | |
|---|---|---|---|---|
| 5,581,642 | A | 12/1996 | Deacon et al. | |
| 5,586,206 | A | 12/1996 | Brinkman et al. | |
| 5,835,458 | A * | 11/1998 | Bischel | G11B 7/1353 369/44.29 |
| 5,911,018 | A | 6/1999 | Bischel et al. | |
| 6,141,475 | A | 10/2000 | Lawrence et al. | |
| 6,167,169 | A | 12/2000 | Brinkman et al. | |
| 10,790,913 | B2 | 9/2020 | Henningsen et al. | |
| 10,950,773 | B1 | 3/2021 | Baretz | |
| 10,972,190 | B2 | 4/2021 | Henningsen et al. | |
| 11,382,380 | B2 | 7/2022 | Dutour et al. | |
| 2006/0028966 | A1 | 2/2006 | Szu | |
| 2014/0254022 | A1 * | 9/2014 | Li | G02B 3/0037 359/619 |
| 2016/0086680 | A1 | 3/2016 | Filler | |
| 2018/0322974 | A1 * | 11/2018 | Kidman | G21B 3/00 |
| 2019/0352022 | A1 | 11/2019 | De Biase | |
| 2020/0394546 | A1 * | 12/2020 | Bronn | G06N 10/40 |
| 2021/0299879 | A1 | 9/2021 | Pinter | |
| 2023/0230710 | A1 * | 7/2023 | Peltola | G21B 3/00 376/107 |
| 2024/0281690 | A1 * | 8/2024 | Bayn | G06N 10/40 |
| 2024/0372629 | A1 | 11/2024 | Plotnikov | |

FOREIGN PATENT DOCUMENTS

| | | | |
|---|---|---|---|
| CN | 1163000 | A | 10/1997 |
| CN | 1164898 | A | 11/1997 |
| CN | 105185026 | B | 12/2015 |
| CN | 107709922 | B | 2/2018 |
| CN | 114254361 | A1 | 3/2022 |
| EP | 3534113 | A1 | 9/2019 |
| KR | 102286161 | B1 | 8/2021 |
| RU | 2119654 | C1 | 9/1998 |
| WO | 1996007943 | A1 | 3/1996 |
| WO | 2015154089 | A1 | 10/2015 |
| WO | 2017167294 | A1 | 10/2017 |
| WO | 2019221833 | A1 | 11/2019 |
| WO | 2019229542 | A2 | 12/2019 |
| WO | 2020167289 | A1 | 8/2020 |

OTHER PUBLICATIONS

Fiscaletti et al., “The Symmetrized Quantum Potential and Space as a Direct Information Medium, Annales de la Fondation Louis de Broglie”, vol. 37, 2012, pp. 31.

Fleagle; “Astrophysical Speculations (An Essay On Phenomena’s Common Basis)”, Aug. 2022, available at: <https://www.researchgate.net/publication/362907066, pp. 17.

* cited by examiner

Fig. 13.a
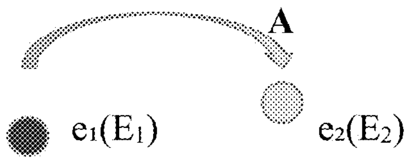
Fig. 13.b
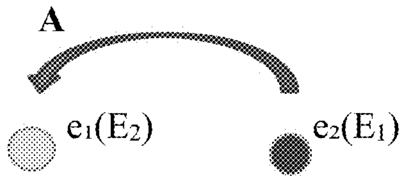

INSTANTANEOUS COMMUNICATION USING VIRTUAL PHOTONS IN A SYSTEM OF TWO COHERENT PARTICLES AND METHODS THEREOF

CLAIM OF PRIORITY

This application claims priority to U.S. Application Ser. No. 63/464,196, filed on May 5, 2023, the contents of which are herein fully incorporated by reference in its entirety.

FIELD OF THE INVENTION

The present invention relates to instantaneous communication between a transmitter and receiver which uses virtual photons in a system of two coherent particles. This invention proposes a solution to the problem of two states in relation to the emergence of two coherent states following a single particle passing diffraction pattern through two slits. This invention further simultaneously proposes a solution to the Entanglement problem.

BACKGROUND OF THE INVENTION

The empirical basis (fundamental experiment) of quantum mechanics is known as electron interference which occurs when an electron passes through two slits. This concept, coupled with the proposed solution to the Entanglement problem, lies at the theoretical base of this device.

It is known that the main problem of quantum mechanics is the problem of two states. For instance, what holds together a proton and a neutron in the core of the nucleus? Furthermore, how can a positively charged proton and a neutrally charged neutron be held together if no Coulombic force exists between them? Dr. Yukawa discovered that the proton and the neutron constantly exchange one particle between each other in the nucleus. This particle was soon discovered and named "meson" ($\pi^o$). It exerts a force of interaction (nuclear force) called the Yukawa force.

Quantum mechanics has certain rules: one of which is that interactions between particles can occur only between coherent (identical) particles or systems. Following this law, how can the nuclear interaction between the proton and the neutron be explained because they are different particles and therefore interaction between them is seemingly impossible? For example, this is one of the reasons why the hydrogen molecule $H_2$ exists in nature while mono-hydrogen H does not. The model of Dr. Yukawa is either incomplete or his assumption is not correct. However, a bigger problem within quantum mechanics which is a corollary to the nuclear interaction paradox is the Entanglement problem.

A second rule of quantum mechanics states that if two coherent particles exist in a closed system, the particles' spin direction (energy level) must differ. So, if the spin of electron one—$e_1$—is directed upwards ↑, the spin of electron two—$e_2$—must be directed downwards ↓ or vice versa. According to this law, if the spin of $e_1$ is directed upwards ↑ the energy level of $e_1$ can be written as E1. At the same time, if the spin of $e_2$ is directed downwards ↓ the energy level of $e_2$ can be written as E2, and $$E1>E2$$

If the direction of the spins is flipped, then the spin of $e_1$ would be directed downwards while the spin of $e_2$ would be directed upwards. The following reverse relationship would ensue:

$$E1<E2$$

A closed system cannot consist of two coherent particles with identical spins (energy level) under any circumstance.

A closed system consisting of two coherent electrons each with a spin of ½ can be considered. If electron $e_1$ has an upwards spin ↑, electron $e_2$ will have a downwards spin ↓. Any electron—in this case $e_1$—with a high energy state is not considered to be a stable system. Thus, it must lower its energy state by releasing quantum energy towards electron $e_2$. Electron $e_2$ must receive this quantum energy in turn increasing (heightening) its energy state. This changes the spin direction of electron $e_2$ from downwards ↓ to upwards ↑. See FIG. 1.

Because the quantum energy (A) transferred from electron $e_1$ to electron $e_2$ travels at the speed of light, the spin direction of both electrons can sometimes be directed downwards ↓.

Where t equals the time at which the spin direction of both electrons is directed downwards C is the speed of light x1, x2 are the coordinates of the electrons $$t=(x2-x1)/C$$

See FIG. 2.

This model—equivalent to the Entanglement problem—of two electrons with downward spins in a closed system contradicts the rules of quantum mechanics. A solution to the Entanglement problem will be provided below.

BRIEF SUMMARY OF THE INVENTION

The present invention relates to methods of splitting two quantum states in a single photon, using as a source of photons, two polaroid filters for coding information and a diffraction pattern comprising two slits for creation of two coherent states. As a result of the interaction between the two coherent states, a virtual photon will appear. The difference between a photon and a virtual photon are the photon moving at the speed of light in space. The virtual photon is not moving, and it will occupy certain discrete coordinates in space from coherent states toward the receiver. Manipulation (decoding information) of the regular photon will instantly cause manipulation of the virtual photon. It is these virtual photons that can be used for a plurality of purposes including their use for the instantaneous transmission of communication messages.

BRIEF DESCRIPTION OF THE SEVERAL VIEWS OF THE DRAWING

FIG. 13.*a* shows an exchange of energy A from point $e_1$ to point $e_2$.

FIG. 13.*b* shows an exchange of energy A from point $e_2$ to point $e_1$.

DETAILED DESCRIPTION OF THE INVENTION

Figure 1:
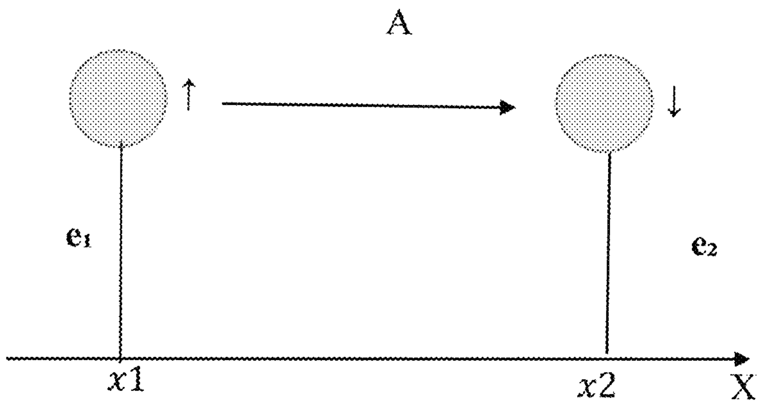
FIG. 1.*a* shows two coherent electrons with spin up ↑ and spin down ↓ at coordinates X1 and X2.
Figure 2:
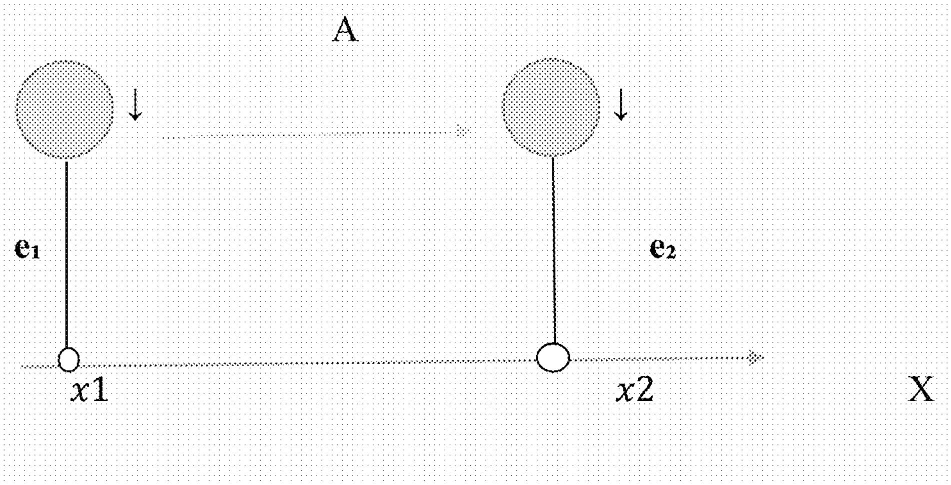
FIG. 2.*a* shows the two coherent electrons with spin down ↓ and spin up ↑ at coordinates X1 and X2.

The present invention relates to methods of splitting two quantum states in a single photon, using as a source of photons, two polaroid filters for coding information and a diffraction pattern comprising two slits for the creation of two coherent states. As a result of the interaction between the two coherent states, a virtual photon will appear. The difference between a photon and a virtual photon are the photon moving at the speed of light in space. The virtual photon is not moving, and it will occupy certain discrete coordinates in space from coherent states toward the receiver. Manipulation (decoding information) of the regular photon will instantly cause manipulation of the virtual photon. It is these virtual photons that can be used for a plurality of purposes including their use for the instantaneous transmission of communication messages.

Initially, one must use a mathematical model to show how one can arrive at the present invention. Subsequently, after the derivation of the mathematical model, the laser containing device of the present invention that relies on the mathematical model is illustrated.

The model assumes that:

1. Two photons transmitted from one source (laser) are not coherent (identical). Two electrons transmitted from one source are not coherent (identical) and so on . . . .
2. The single photon and electron in a closed system comprises two quantum states: spin up and spin down at the same time. The amplitude of probability Ψ of a single photon has any combination of spin orientations in quantum state 1 and quantum state 2.
3. One must consider that the amplitude of probability Ψ will have two base states, C1 and C2, where: C1 is the amplitude of probability that the spin 1 will have spin direction up ↑ and spin 2 will have spin direction down ↓. Moreover, C2 is the amplitude probability that spin 1 will have spin direction down ↓ and spin 2 will have spin direction up ↑.

The overall amplitude of probability of having either combination can be determined as the sum of the base states, as shown in the below formula:

$$\Psi = |\uparrow\downarrow> + |\downarrow\uparrow> = C1 + C2$$

The amplitude of probability Ψ consists of two basis states $C_1$ and $C_2$, with $C_1$ being the amplitude of probability that zone 1 has spin orientation up ↑ and zone 2 being the amplitude of probability Ψ with spin orientation down ↓. $C_2$ is the amplitude of probability that zone 1 has spin orientation down ↓ and zone 2 has spin up ↑. The overall probability is given in the following formula:

$$\text{Overall}\ \ \Psi = \sum_{i=1}^{n} Cn = C_1 + C_2.$$

2. One must assume also that the amplitude of probability Ψ is that the electron with spin ½ comprises two quantum states, spin up and spin down, at the same time in one particle. The amplitude of probability Ψ comprises two basis states, which is the sum of the two basis states $C_1$ and $C_2$. The basis state $C_1$ is the amplitude of probability that zone 1 will have spin up ↑ and zone 2 will have spin down ↓ (see FIG. 3.*a*). The basis state $C_2$ is the amplitude of probability that zone 1 will have spin down ↓ and zone 2 will have spin up ↑ see FIG. 4.*a*

Figure 3:
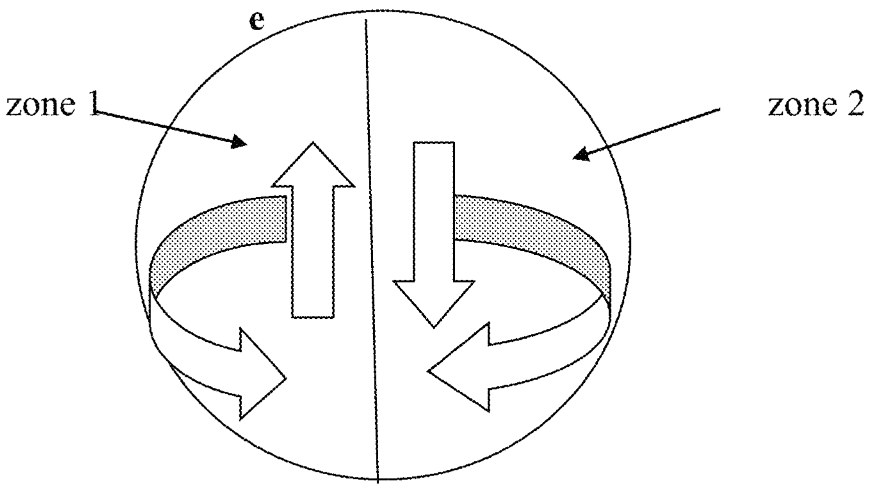
FIG. 3 shows the electron e with spin ½ comprises two states: that the basis state $C_1$ has the zone number 1 and will have spin up ↑ and zone number 2 will have spin down ↓.

FIG. 3.*a* shows that the electron e with spin ½ comprises two states: a basis state one wherein $C_1$ is in the zone number 1 and will have spin up ↑ and zone number 2 will have spin down ↓.

Figure 4:
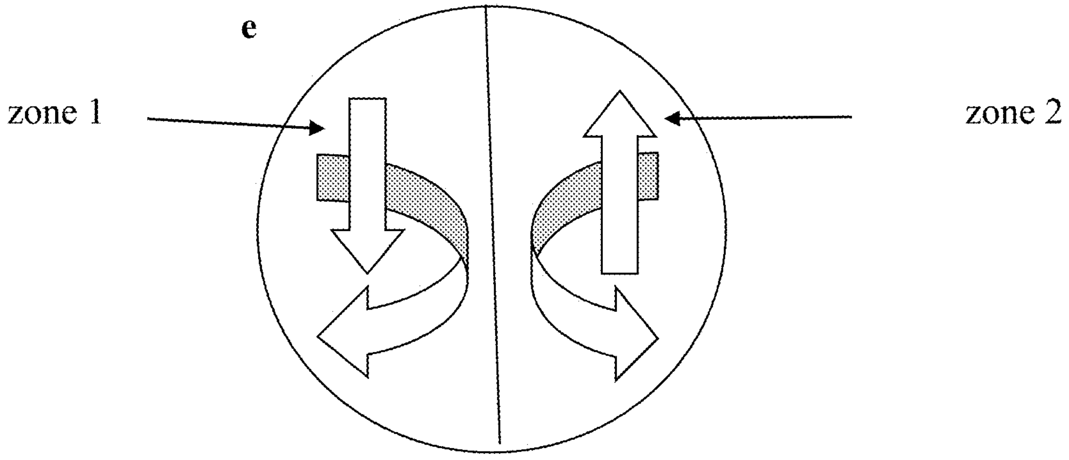
FIG. 4. shows the electron e with spin ½ comprising two states: basis state two $C_2$ which corresponds to zone number 1 and will have spin down ↓ and zone number 2, which will have spin up ↑.

FIG. 4.*a* The electron e with spin ½ consist of two states: that the basis state two $C_2$ are the zone number 1 will have spin down ↓ and zone number 2 will have spin up ↑.

What is the Difference Between Bullets and Electrons?

It is instructive to observe the difference between bullets and electrons as a means of understanding how electrons act.

The Case 1.

In a closed system comprising one gun, a wall with two holes, a backstop and a movable detector, a series of shots from the gun should be considered when hole 1 is open and hole 2 is closed. In this case, one obtains distribution $P_1$, and in the case where hole 1 is closed and hole 2 is open, one obtains distribution $P_2$. In the case where two holes are open (hole 1 and hole 2), one obtains distribution $P_{12}$. $P_1$ is the probability of the process when bullets from the gun pass hole 1, which is open and hit the detector when hole 2 is closed and $P_2$ is the probability of the process when bullets from the gun pass hole 2, which is open when hole 1 is closed. The distribution of $P_{12}$ reflects the probability of the process when two holes are open, and the bullets hit the target from the gun through holes 1 and holes 2. (see FIG. 5).

Figure 5:
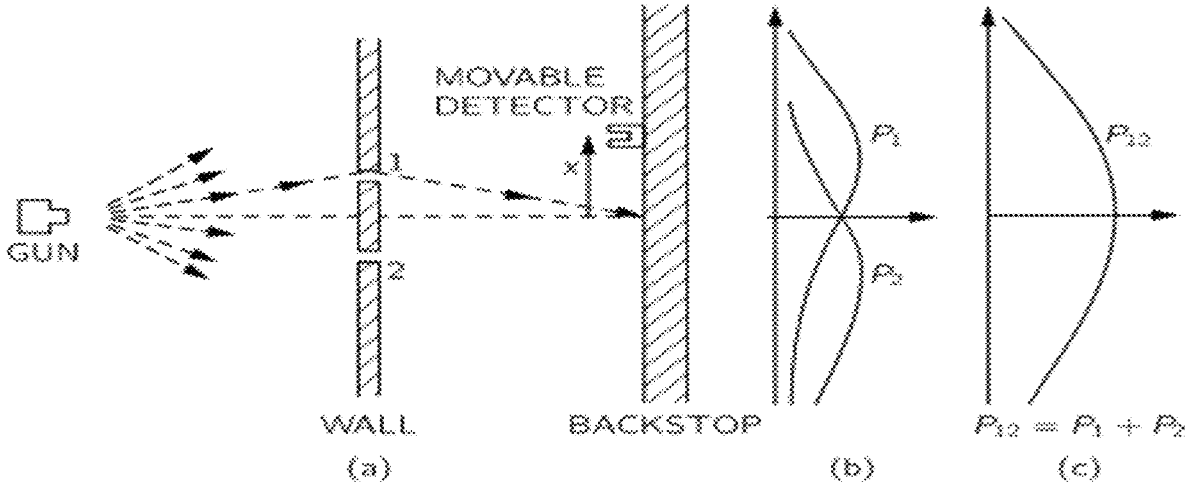
FIG. 5 shows an interference experiment with bullets from a gun.

FIG. 5 shows an interference experiment with bullets shot from a gun.

In this experiment, the probability $P_{12}$ when both hole 1 and hole 2 are open equals the sum of probabilities $P_1$ and $P_2$.

$$P_{12} = P_1 + P_2$$

In a second case, the experiment involves an electron gun. In the closed system comprising an electron gun, a wall with two holes, a backstop and a detector a series of shots from the electron gun if hole 1 is open and hole 2 is closed is given by distribution $P_1$, wherein if hole 1 is closed and hole 2 is open, one obtains distribution $P_2$. In the case where two holes are open, one obtains distribution $P_{12}$. $P_1$ is the probability of the process when electrons from the gun pass hole 1 and hit the detector where hole 2 is closed and $P_2$ is the probability of the process when electrons from the gun pass hole 2 when hole 1 is close. The distribution of $P_{12}$ reflects the probability of the process when two holes are open, and electrons hit the target from the gun through holes 1 and holes 2. (see FIG. 6).

Figure 6:
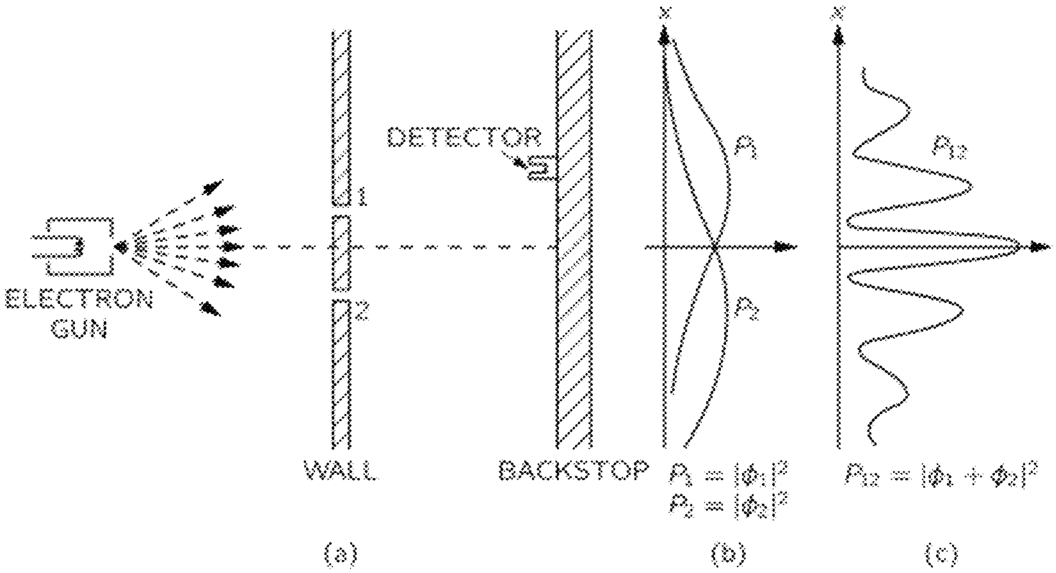
FIG. 6 shows an interference experiment with electrons from an electron gun.

FIG. 6 shows an interference experiment with electrons. In the second case, the probabilities $P_1$ and $P_2$ will be described as:

$$P_1 = |\Psi_1|^2 \text{ and } P_2 = |\Psi_2|^2$$

Where $\Psi_1$ and $\Psi_2$ are amplitudes of probability.

The sum of probability $P_{12}$ is obtained as shown in the equations below:

$$P_{12} = |\Psi_1 + \Psi_2^2|$$

$$P_{12} = P_1 + P_2 + 2 \cdot \Psi_1 \cdot \Psi_2$$

The logical question arises—"Why is it that when bullets are used, one is concerned with a Probability whereas in the case of electrons one uses the term Amplitude of probability?" The usual answer is "All electrons emitting from the electron gun are coherent (identical). That is the reason why one uses the terminology and mathematical calculation for amplitude of probability $\Psi$".

However, it should be noted that all electrons emitting from the "electron gun" are not coherent (i.e., identical). The various electrons can have different energies, phases and other characteristics. Accordingly, because all of the electrons are not coherent, using the term probability is not appropriate to electrons transmitted from the "electron gun". The mathematical calculation should be no different between bullets and electrons. But electrons somehow create an interference distribution. What is the reason for this?

The Model of the Electron.

To answer the above dilemma, one can assume that the single electron in a closed system comprises two quantum states: spin up and spin down, which can occur simultaneously. The amplitude of probability $\Psi$ for a single electron is that it can have any combination of spin orientations. (See FIG. 7)

Figure 7:
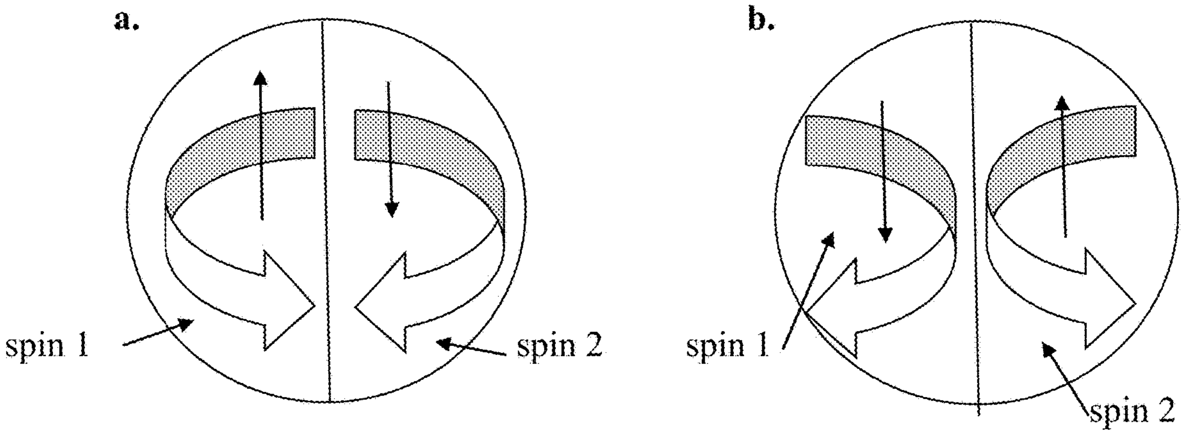
FIG. 7 shows the electron e with spin ½ comprises two coherent states: the amplitude of probability Ψ is electron is in one of the states. The basis state $C_1$ when spin 1 directed up ↑ and spin 2 directed down ↓. FIG. a. The basis state $C_2$ when spin 1 directed down ↓ and spin 2 directed up ↑. FIG. b.

FIG. 7 shows the electron e with spin ½ comprises two coherent states: the amplitude of probability $\Psi$ is the probability that the electron is in one of the states. The basis state $C_1$ when spin 1 is directed up ↑ and spin 2 is directed down ↓. FIG. a. The basis state $C_2$ when spin 1 is directed down ↓ and spin 2 is directed up ↑. FIG. b.

The amplitude of probability $\Psi$ is the sum two basis states $C_1$ and $C_2$ and is given by the following formula.

$$\Psi = |\uparrow_1 \downarrow_2 > + |\downarrow_1 \uparrow_2 >= C_1 + C_2$$

The Problem of a Single Electron and Two Holes in a Wall in a Closed System.

One can assume the single electron with two states spin up and spin down in a closed system was transmitted in the direction towards a wall with two holes. See FIG. 8.

Figure 8:
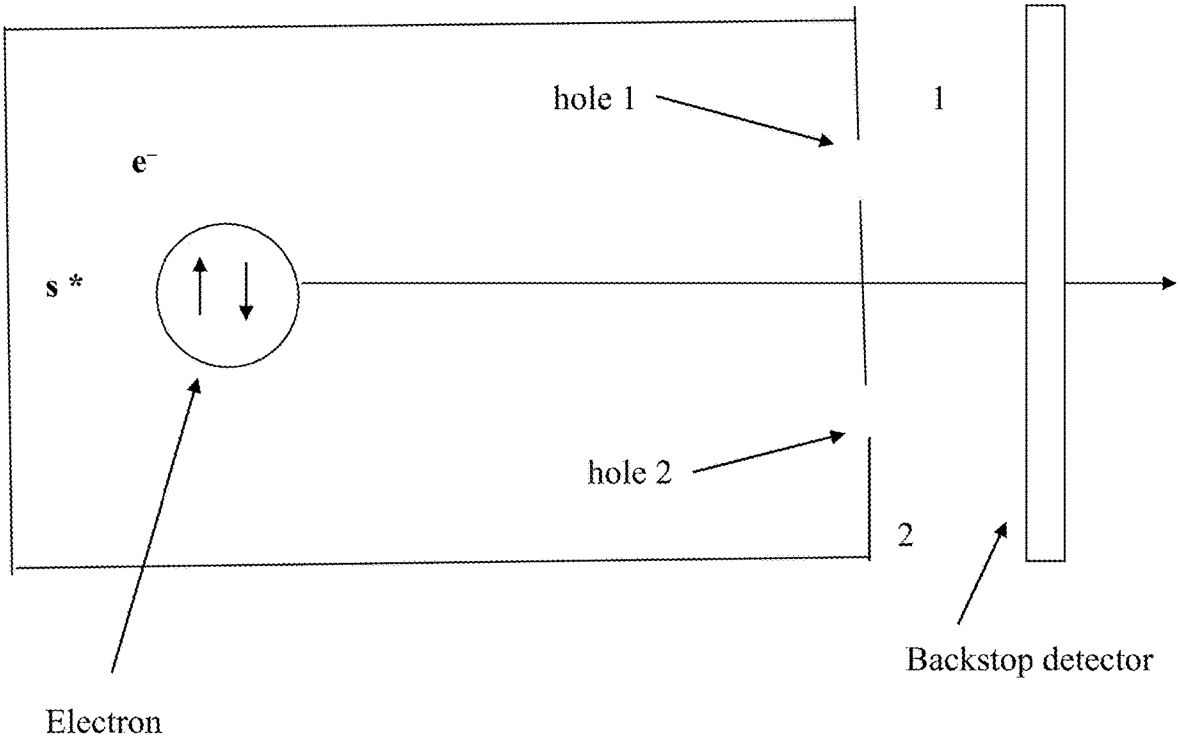
FIG. 8 shows an experiment where: S is the source of electrons, e-represents the electron with two quantum states spin up and spin down, and a wall with two holes 1 and 2 and with a backstop detector.

FIG. 8 Where: S is the source of electrons, $e^-$ is the electron with two quantum states: spin up and spin down, a wall with two holes 1 and 2 and a backstop detector.

One must consider three cases:

Case 1. The hole 1 is open and hole 2 is closed. The single electron passes through hole 1 and creates a single flash on a backstop detector.

Case 2. The hole 2 is open and hole 1 is closed. The single electron passes through hole 2 and creates a single flash on a backstop detector.

Figure 9:
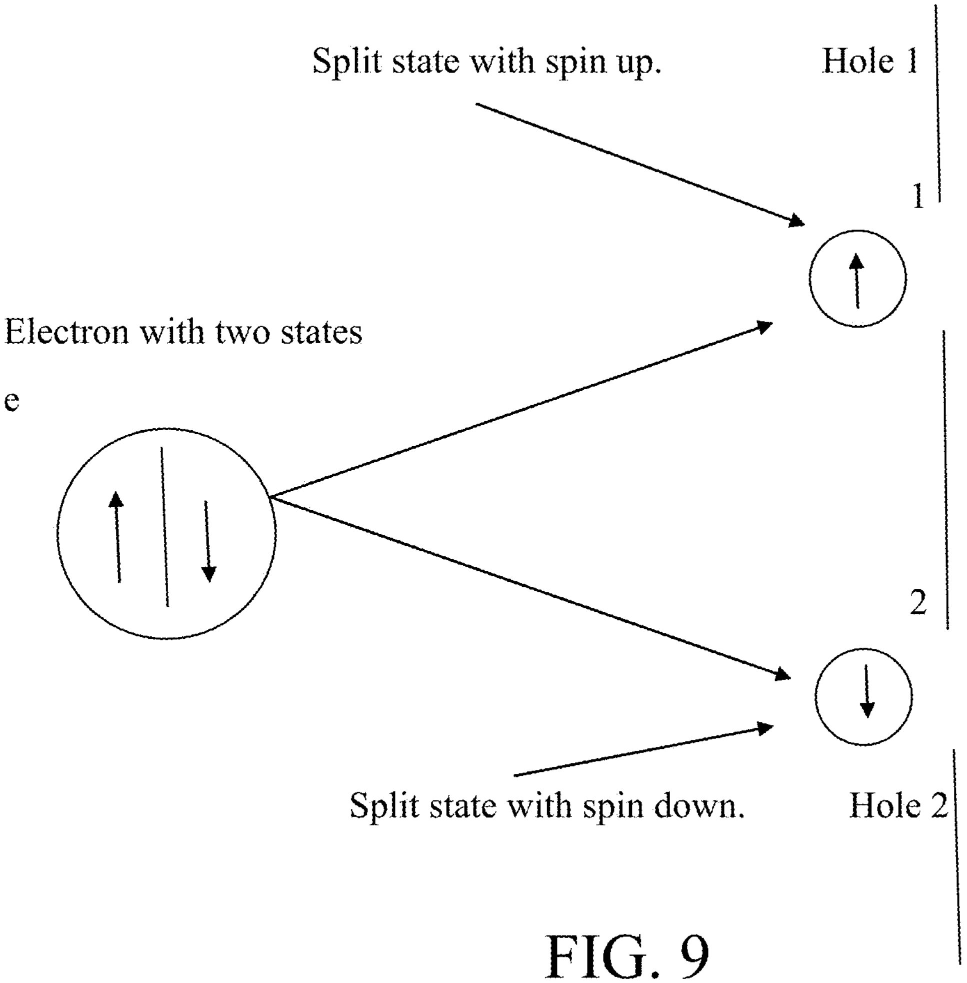
FIG. 9 shows the experimental design of the electron state with spin up passing through hole 1 and with spin down passing through hole 2.

Case 3. Both holes are open. This case may also be called the "case of confusion" when the electron "decides" which hole it is to use. Because holes 1 and 2 are similar, the electron must pass through hole 1 and hole 2 at the same time by splitting its two quantum states with the state with spin up passing through hole 1 and the state with spin down passing through hole 2 and vice versa. This is illustrated by the full interference pattern shown in FIGS. 9*a* and 9*b*.

FIG. 9*a* shows the state with spin up passing through hole 1 and the state with spin down passing through hole 2. FIG. 9*b*. shows the state with spin down passing through hole 1 and the state with spin up passing through hole 2.

One should take into consideration that the amplitude of probability $\Psi$ of two states with any spin combination will pass through the holes 1 and 2, have two basis states, $C_1$ and $C_2$, where: $C_1$ is the amplitude of probability that the split state with spin up will pass through hole 1 and the split state with spin down will pass through hole 2. See FIG. 9.*a*. $C_2$ is the amplitude of probability $\Psi$ here the split state with spin down will pass through hole 1 and the split state with spin up will pass through hole 2. See FIG. 9.*b*.

The amplitude of probability $\Psi$ is the sum of $C_1$ and $C_2$ and is given by the following formula.

$$\Psi = \sum_{i=1}^{n} C_n = C_1 + C_2$$

Figure 10:
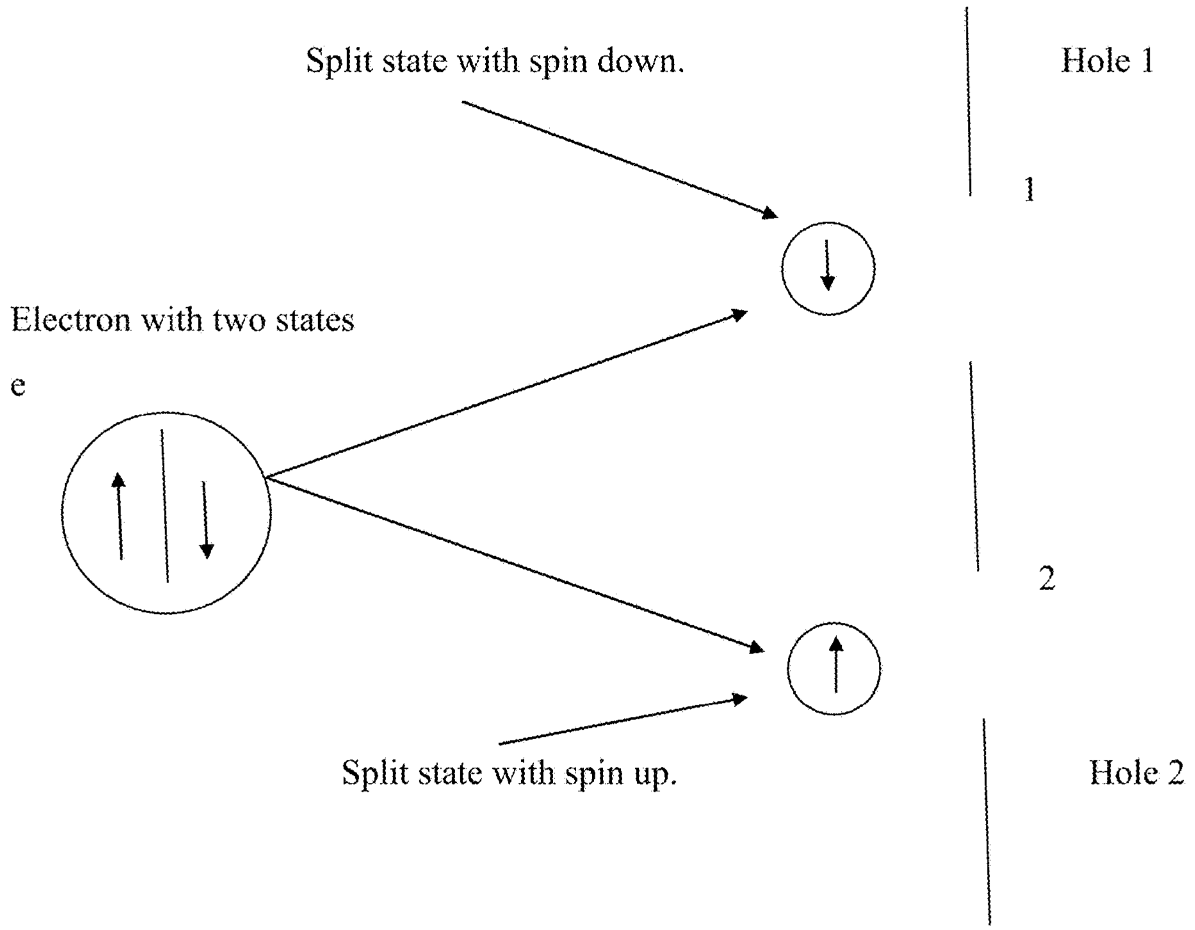
FIG. 10 shows the experimental design of the electron state with spin down passing through hole 1 and with spin up passing through the hole 2.

FIG. 10.*a*. C1 is the amplitude of probability that the split state spin up will pass through hole 1 and the split state with spin down will pass through hole 2.

FIG. 10.*b*. $C_2$ is the amplitude of probability that the split state with spin down will pass through hole 1 and the split state with spin up will pass through hole 2.

The Energy Created by the Spin Combination of State (Point $e_1$) One and the Spin Combination of State (Point $e_2$) Two in the Central Point Q Between these States.

One can examine a closed system where one has two coherent states, after splitting the electron into two quantum states and passing the electron through two holes. See FIG. 11.

Figure 11:
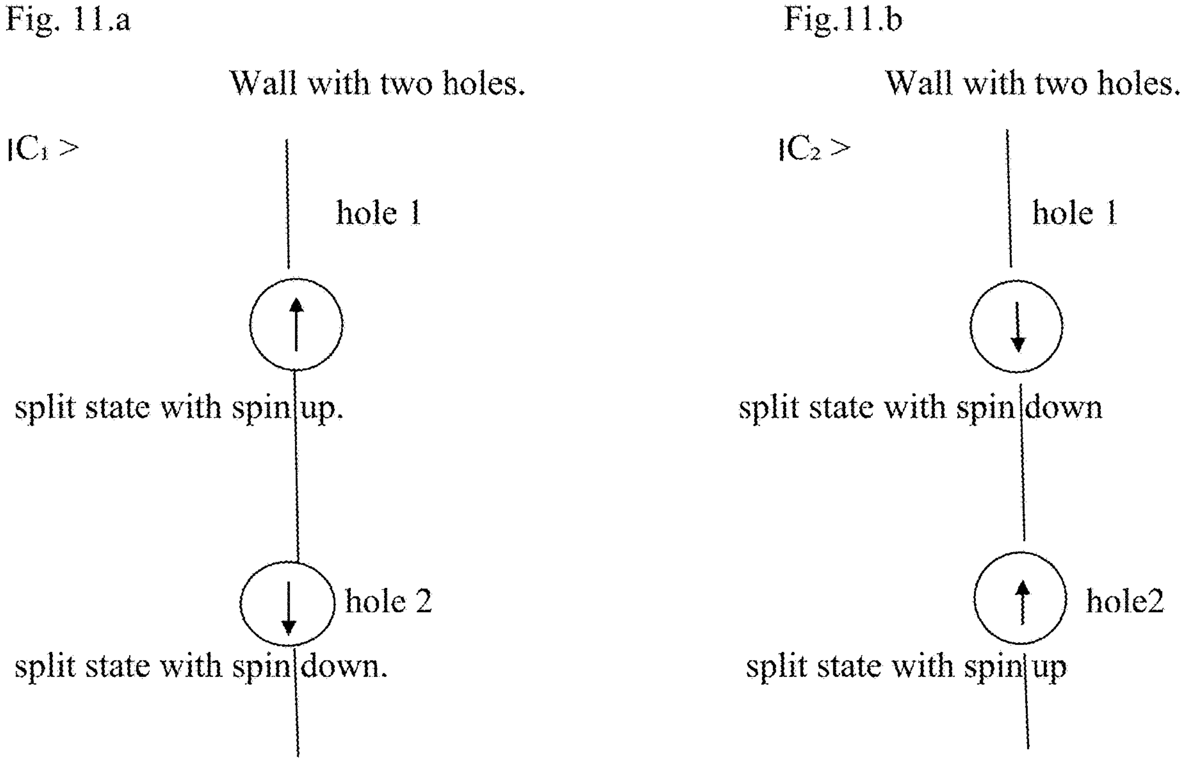
FIG. 11A shows that $C_1$ is the amplitude of probability that the split state with spin up passed through hole 1 and that the split state with spin down passed through hole 2.
FIG. 11B shows that $C_2$ is the amplitude of probability that the split state with spin down passed through hole 1 and split state with spin up passed through hole 2.

FIG. 11 shows that state 1 is $e_1$ and state 2 is $e_2$. The x-coordinate of $e_1$ is $X_1$ and x-coordinate of $e_2$ is $X_2$. The x-coordinate of point Q is $X_{12}$ The x-coordinate of the point $e_1$ will be $X_1$ and the x-coordinate of the point $e_2$ will be $X_2$, the point $X_{12}$ will lie between the points $X_1$ and $X_2$ at a distance from either point, which is illustrated by the following formula.

$$X_{12} = (X_1 - X_2)/2$$

One should consider the closed system comprising one split state point $e_1$ and one split state point $e_2$ with the point $e_1$ having spin ½ and point $e_2$ having spin ½.

The closed system is in a quiescent state, and the movements and fluctuations of the points $e_1$ and $e_2$ are disregarded. One can suggest that the points $e_1$ and $e_2$ possess their own spins.

One can consider the energy at point Q, which will be created by means of the combination of the spins of the points, $e_1$ and $e_2$.

As one can see, the overall energy probability amplitude at point Q will be created by means of two probable combinations of spins, at point $e_1$ and point $e_2$. The overall amplitude of the presence of energy in point Q will be defined by the sum of the basic conditions $C_1$ and $C_2$, where the basis state $C_1$ is defined by the combination: point $e_1$ spin up $e_1$ (↑) and point $e_2$ spin down $e_2$ (↓), which is shown in the following formula.

$$C_1 = |e_1 \uparrow / e_2 \downarrow >$$

Basis state $C_2$ is defined by the combination: point $e_1$ spin down $e_1$ (↓) and point $e_2$ spin up $e_2$ (↑).

$$C_2 = |e_1 \downarrow / e_2 \uparrow >$$

$$\Psi_{total} = \sum_{i=1}^{n} Cn \tag{1-1}$$

$$\Psi_{total} = C_1 + C_2 \tag{1-2}$$

The energy of each basic condition at point Q is defined by the system of four linear differential equations.

$$i * \hbar * \frac{dCn}{dt} = \sum_{i=1}^{n} \hat{H}_i * C_n \tag{1-3}$$

Where Ĥ is the Hamiltonian, the energy of each basis condition.

$$\begin{cases} i * \hbar \frac{dC1}{dt} = C_1 * H_{11} + C_2 * H_{12} \\ i * \hbar \frac{dC2}{dt} = C_1 * H_{21} + C_2 * H_{22} \end{cases} \tag{1-4}$$

The solution for the linear differential equations is the function.

$$C_n = a_n * e^{-i*E*t/\hbar} \tag{1-5}$$

After reduction, one obtains:

$$\begin{cases} E_1 * a_1 = a_1 * H_{11} + a_2 * H_{12} \\ E_2 * a_2 = a_1 * H_{21} + a_2 * H_{22} \end{cases} \tag{1-6}$$

Coefficient $a_n$ depends on the distance between point Q, point $e_1$ and point $e_2$ and is defined by the equation:

$$a_n = e^{-ikxn} \tag{1-7}$$

After insertion and rearrangement, one obtains:

$$\begin{cases} E_1 e^{-ikx1} = H_{11} e^{-ikx1} + H_{12} e^{-ikx2} \\ E_2 e^{-ikx2} = H_{21} e^{-ikx1} + H_{22} e^{-ikx2} \end{cases} \tag{1-8}$$

One can assume.

$$x_1 = -x_2 \tag{1-9}$$

then

After reduction one obtains:

$$\begin{cases} E_1 = H_{11} + H_{12} \\ E_2 = H_{21} + H_{22} \end{cases} \tag{1-10}$$

The value of $E_1$ and $E_2$ is defined by the matrix.

$$\det \begin{vmatrix} H_{11} & H_{12} \\ H_{21} & H_{22} \end{vmatrix} = 0 \tag{1-11}$$

If the terms of Hamiltonian don't depend on a time value, one obtains.

$$H_{11} = E_0 + A,\ H_{22} = E_0 - A,\ H_{12} = H_{21} = A \tag{1-12}$$

After insertion one obtains the matrix as follows:

$$\det\begin{vmatrix} E_0 + A & A \\ A & E_0 - A \end{vmatrix} = 0 \tag{1-13}$$

After solving the quadratic equation, one obtains two real solutions as follows.

$$E_1 = E_0 + 2A \tag{1-14}$$

$$E_2 = E_0 - 2A \tag{1-15}$$

As one can see, point Q can be represented by the 2 energy conditions—$E_1$ and $E_2$ because of the spin combinations of point $e_1$ and point $e_2$. The overall probability amplitude of point Q can be in either of two conditions and is defined by the formula.

$$\Psi_{total}(E_1, E_2) = \Psi_1(E_1) + \Psi_2(E_2) \tag{1-16}$$

$$\Psi_1(E_1) = a_1 * e^{-i*(E_0+2A)*t/\hbar},\ \Psi_2(E_2) = a_2 * e^{-i*(E_0-2A)*t/\hbar} \tag{1-17}$$

If one assumes that: $a_1=a_2=a$ $$\Psi_{total} = a*\left(e^{-i*(E_0+2A)*t/\hbar} + e^{-i*(E_0-2A)*t/\hbar}\right) \tag{1-18}$$

$$\Psi_{total} = 2*a*\cos\left((E_0+2A)*t/\hbar\right) \tag{1-19}$$

Therefore, the amplitude of the probability of point Q possessing energy $E_1$ and $E_2$ is described by the potential function, depending on the time value.

The Appearance of an Elementary Paired Exchange in a System of Two Coherent States.

Figure 12:
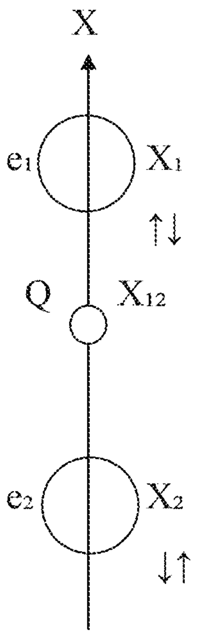
FIG. 12 shows that state 1 is $e_1$ and that state 2 is $e_2$.

One can assume that there are two coherent points with two energy levels: $e_1$ ($E_1$) and $e_2$ ($E_2$) in a closed system, as shown in FIG. 12.*a.b.*

Given that the system is closed and if one assumes that point $e_1$ possesses energy $E_1$, point $e_2$ will possess energy $E_2$ at the same time. The reason that points $e_1$ and $e_2$ cannot both be present in one and the same energy condition within the closed system is because they must differ from each other in terms of their energy values. It should be apparent that if point $e_1$ possesses a value of energy $E_2$, point $e_2$ will possess a value of energy $E_1$.

One can assume that energy $E_1>E_2$.

One can define a general condition so that points $e_1$ and $e_2$ possess values of energy $E_1$ and $E_2$, respectively.

One can define the first basic condition as $C_1$ and assume that point $e_1$ possesses a value of energy $E_1$ and point $e_2$ possesses a value of energy $E_2$.

FIG. 12 shows point $e_1$ with energy $E_1$ is unstable and a system with a bigger energy value will try to decrease it, releasing energy A in a direction of point $e_2$, thereby decreasing its energy to a value of energy $E_2$. Point $e_2$ will accept this energy and raise its own energy from $E_2+A=E_1$. See FIG. 12*a.*

One can define the second basic condition C2 as a condition where point $e_1$ possesses a value of energy $E_2$ and point $e_2$ possesses a value of energy $E_1$.

Similar to the first condition, point $e_2$ will decrease its energy by means of releasing energy A in the direction of point $e_1$. See FIG. 12.*b*

The overall probability amplitude is defined by the superposition of amplitudes $C_1$ and $C_2$.

$$\Psi_{total} = |C_1> + |C_2> \tag{1-20}$$

The energy exchange is similar to nuclear and molecular energy exchange. The energy of such process is defined by the following linear differential equations.

$$\begin{cases} i*\hbar\dfrac{dC1}{dC} = C_1*H_{11} + C_2*H_{12} \\ i*\hbar\dfrac{dC2}{dC} = C_1*H_{21} + C_2*H_{22} \end{cases} \tag{1-21}$$

The energy of the basic condition $C_1$ shall be equal to $E_1$ and $C_2$ shall be equal to $E_2$, and the following formula is obtained.

$$\Psi_{total} = 2*a*\cos\left((E0+A)*t/\hbar\right) = 2*a*\cos((\omega 0 + \omega A)*t) \tag{1-22}$$

where $\omega_0$ is the particle rotational rate and QA is the exchange rate for portions of energy.

The energy exchange is continuous in terms of space. The energy of the basic condition $C_1$ is defined as $E_1$, and the energy of basic condition $C_2$ is defined as $E_2$.

One can calculate a common solution for the system of equations (1-21) using the below differential equations and Hamiltonians.

$$\begin{cases} i*\hbar*\dfrac{dC1}{dC} = C_1*H_{11} - C_2*H_{12} \\ i*\hbar*\dfrac{dC2}{dC} = C_1*H_{21} - C_2*H_{22} \end{cases} \tag{1-23}$$

$$\text{where } H_{12} = -H_{21}$$

$$H_{11} = -H_{22}$$

Subtracting the bottom equation from the top one, one obtains:

$$i*\hbar*\frac{d(C1-C2)}{dt} = (C1-C2)*(-H_{22} - C_2*H_{12}) \tag{1-24}$$

$$i*\hbar*\frac{d(C1+C2)}{dt} = (C_1+C_2)*(H_{12} - C_2*H_{22}) \tag{1-25}$$

$$C_1 + C_2 = a*e^{-i(E0-A)*\frac{t}{\hbar}} \tag{1-26}$$

$$C_1 - C_2 = b*e^{-i(E0+A)*\frac{t}{\hbar}} \tag{1-27}$$

$$C_1(t) = \frac{a}{2}*e^{-i(E0-A)*\frac{t}{\hbar}} + \frac{b}{2}*e^{-i(E0+A)*\frac{t}{\hbar}} \tag{1-28}$$

$$C_2(t) = \frac{a}{2}*e^{-i(E0-A)*\frac{t}{\hbar}} - \frac{b}{2}*e^{-i(E0+A)*\frac{t}{\hbar}} \tag{1-29}$$

After rearrangement, one obtains:

$$C_1(t) = e^{-\frac{iE0t}{\hbar}}*\cos\left(A*\frac{t}{\hbar}\right) \tag{1-30}$$

-continued $$C_2(t) = e^{-\frac{iE0t}{\hbar}} * \sin\left(A * \frac{t}{\hbar}\right) \quad (1\text{-}31)$$

Formulas 1-30 and 1-31 show the real transfer of energy from point $e_1$ and point $e_2$. The overall amplitude of the probability of energy presented in point $e_1$ and point $e_2$ can be defined as follows:

$$C_1(t) + C_2(t) = e^{-\frac{iE0t}{\hbar}} * \left(\cos\left(A * \frac{t}{\hbar}\right) + i * \sin\left(A * \frac{t}{\hbar}\right)\right) \quad (1\text{-}32)$$

FIG. 13 shows the reflected constant exchange energy A between points $e_1$ and $e_2$.

A constant exchange of portions of energy A between chosen points $e_1$ and $e_2$ takes place in the system of two coherent states. Points $e_1$ and $e_2$ possess different levels of energy because the process is continuous in time which provides the energy for binding two couples together. See FIG. 13.

Figure 14:
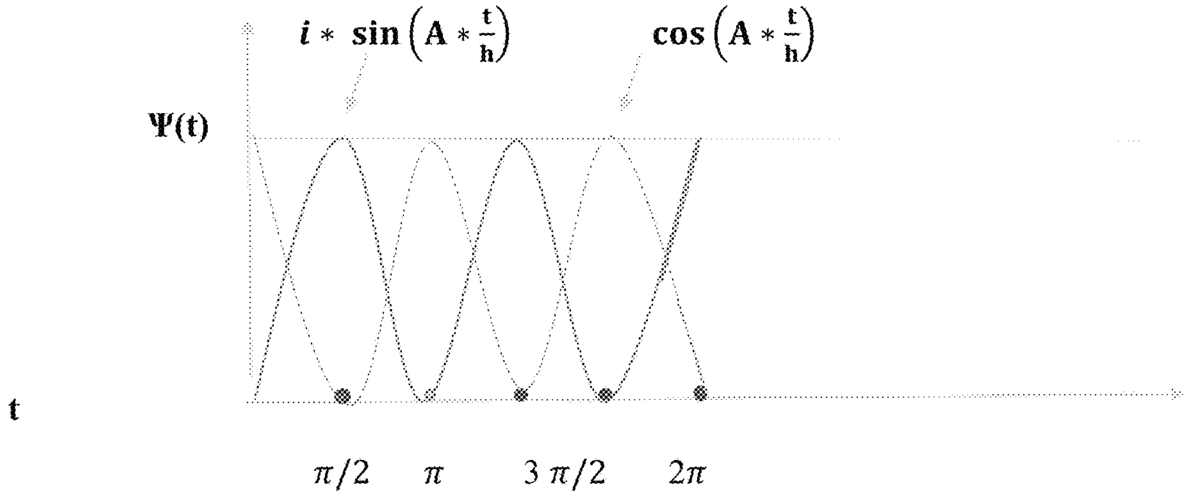
FIG. 14 shows reflected constant exchange of energy A between points $e_1$ and $e_2$.

FIG. 14 shows the energy differences between points $e_1$ and $e_2$ are represented as follows: $e_1$ energy $E_1=E_0+A$ and for $e_2$ energy $E_2=E_0-A$.

After inserting the energy values of $E_1$ and $E_2$ into the system of equations (1-13) and undergoing mathematical transformations, one obtains an equation representing the exchange energy between two coherent points $e_1$ and $e_2$ in the system of two coherent particles.

$$\Psi_I(E) = B * \cos\left(\frac{2 * E0 * t}{\hbar}\right) + i * B * \sin\left(\frac{2 * E0 * t}{\hbar}\right) \quad (1\text{-}33)$$

where B is a complex value that depends on the distance between the particles, R.

$$B = 2 * e^{-2iKR} * \cos(K * R) \quad (1\text{-}34)$$

$$B = 2 * B_0 * \cos(K * R) \quad (1\text{-}35)$$

where:

$B_{0-}$ is a complex number that depends on $e^{-2iKR}$ and R is the radius vector distance between points $e_1$ and $e_2$, and $$\cos(K * R) = 0 \quad (1\text{-}36)$$

K*R=½ π; 3/2π; 5/2π and so on.

In coordinates:

$$R_1 = \frac{\pi}{2K}; R_2 = \frac{3\pi}{2K}; R_3 = \frac{5\pi}{2K} \ldots$$

and the complex value becomes zero.

Figure 15:
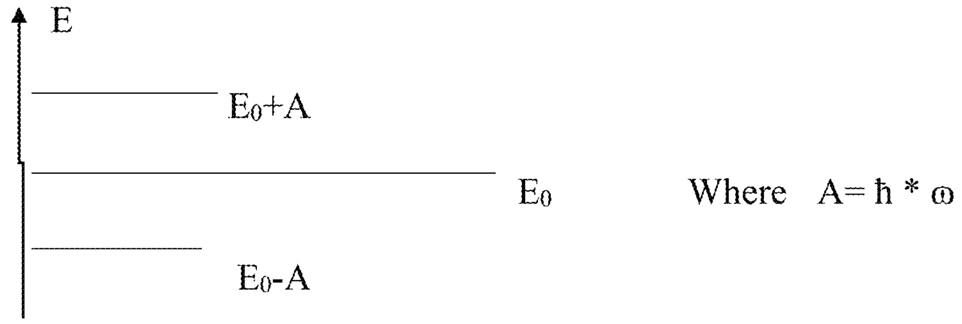
FIG. 15 shows the energy differences between points $e_1$ and $e_2$; which for $e_1$ energy is $E_1=E_0+A$ and for $e_2$ energy is $E_2=E_0-A$.

FIG. 15 shows that the energy interaction at some point in space becomes zero 0.

If one analyzes equation (1-35), one should note that the energy interaction at some point in space becomes zero 0. It is meant quantitatively that the change in energy A from point $e_1$ cannot go to directly to point $e_2$, because the amplitude probability for energy A in coordinate $$\frac{\pi}{2K}$$

becomes zero.

$$\cos(K * R) = 0 \quad (1\text{-}36)$$

K*R=½π; 3/2π; 5/2π and so on.

In the coordinates:

$$R_1 = \frac{\pi}{2K}; R_2 = \frac{3\pi}{2K}; R_3 = \frac{5\pi}{2K} \ldots$$

the amplitude of probability Ψ~ cos (K*R) becomes zero.

The following equations can be obtained:

$$Bx = 2 * B_{0x} * \cos(K * R_x) \quad (1\text{-}37)$$

$$By = 2 * B_0 y * \cos(K * Ry) \quad (1\text{-}38)$$

$$Bz = 2 * B_0 z * \cos(K * Rz) \quad (1\text{-}39)$$

wherein Bx, By and Bz represent complex values that depend on the distance between the particles, R, which is a harmonic function in three-dimensional space X, Y and Z.

What are Virtual Electrons and Virtual Photons?

By splitting an electron particle $e^-$ into two (2) quantum states, one produces a pair of coherent electrons—that is, virtual electrons $e^v_1$ and $e^v_2$. The interaction between two virtual electrons $e^v_1$ and $e^v_2$ is carried out by means of virtual photons $\gamma^v$. The difference between a photon and a virtual photon is that, unlike a photon γ that moves at the speed of light c, a virtual photon rests at discrete points in space where the amplitude of the probability of exchanging spin states is maximal and it cannot occupy points in space where the amplitude of the exchange of spin states vanishes to zero 0. A virtual photon is the result of spin combinations of virtual electrons at discrete points in space. See FIG. 16.

Figure 16:
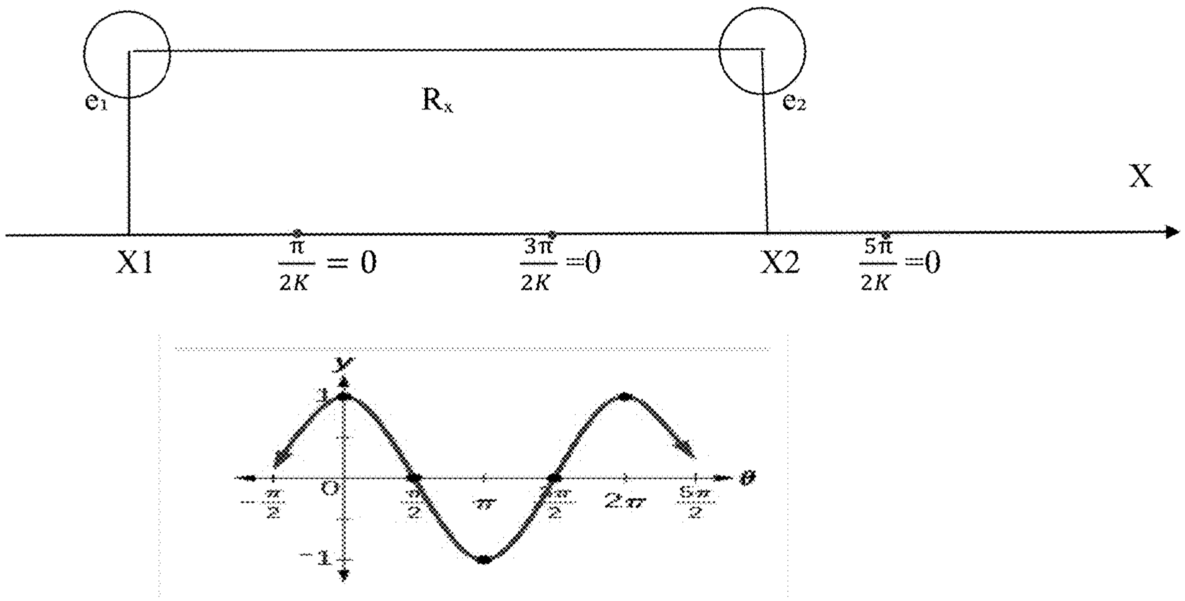
FIG. 16 shows the energy interaction at some point in space becomes zero 0.
Figure 17:
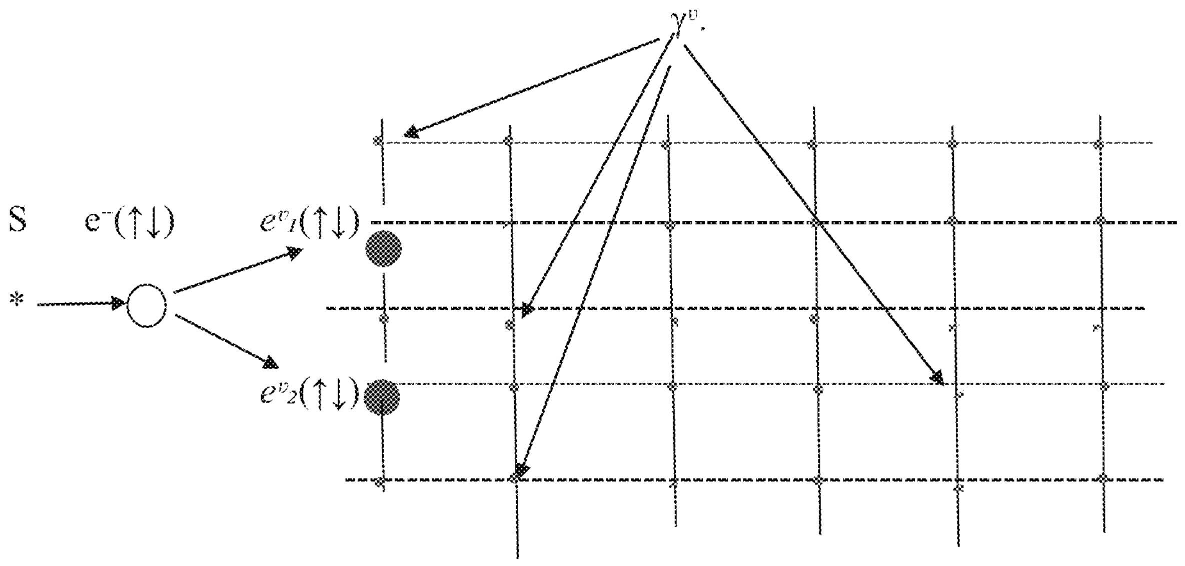
FIG. 17 shows that the interaction between two virtual electrons $e^v_1$ and $e^v_2$ is carried out by means of virtual photon $\gamma^v$ (shown by the red dots).

FIG. 16 shows the interaction between two virtual electrons $e^v_1$ and $e^v_2$ that is carried out by means of virtual photon $\gamma^v$ (Red dots).

Because the virtual photon does not move from one coordinate point to another coordinate point, but instantly occupies discrete points in space, the present invention relates to creating a device based on the electron interference experiment on two slits, which sends a signal from the transmitter to the receiver—(i.e., the antenna) instantly.

The Device Prototype—Virto-Pro.

A prototypical device for the instant invention has been created that relies on the experiment of electron diffraction with two slits with the addition of two polarization filters for signal coding.

Description of the Device

The device consists of a laser (photon source), two polarized filters, a diffraction grating with two slits, a diverging lens for creating a parallel photon beam, two panels, a wall with a hole, a receiver-antenna that comprises a photo element, a piezo element, and an emitter for detecting voltage changes in the output of the device. The device is shown in FIGS. 18A-B and various parts of the device and/or experiment using the device of the present invention are shown in FIGS. 18-24.

Figure 18A:
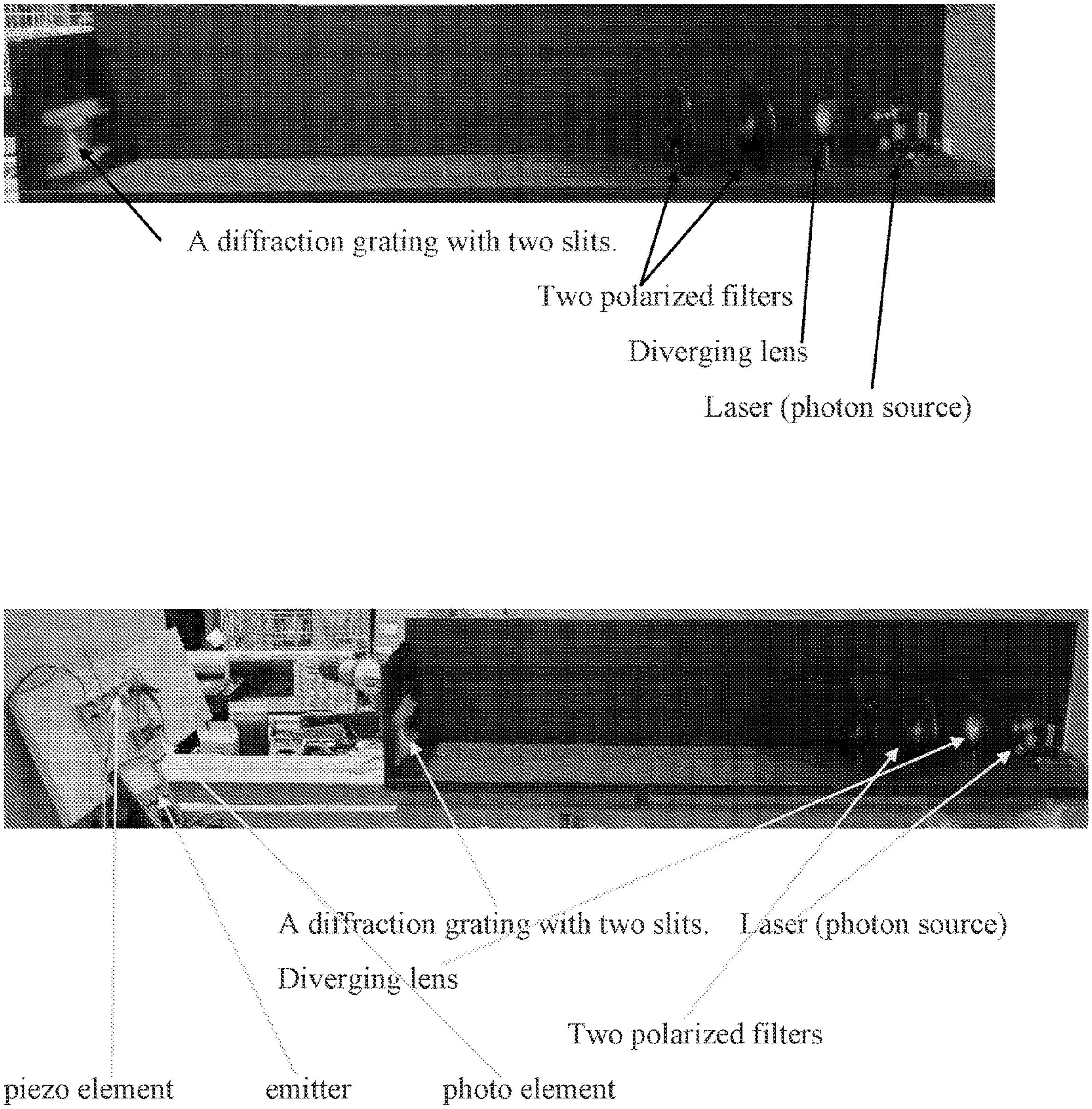
FIGS. 18A-B shows the Virto-Pro device without a receiver, which comprises a Laser (i.e., the photon source), two polarized filters, a diffraction grating with two slits, a diverging lens for creating a parallel photon beam, two panels, and a wall with a hole.
Figure 18B:
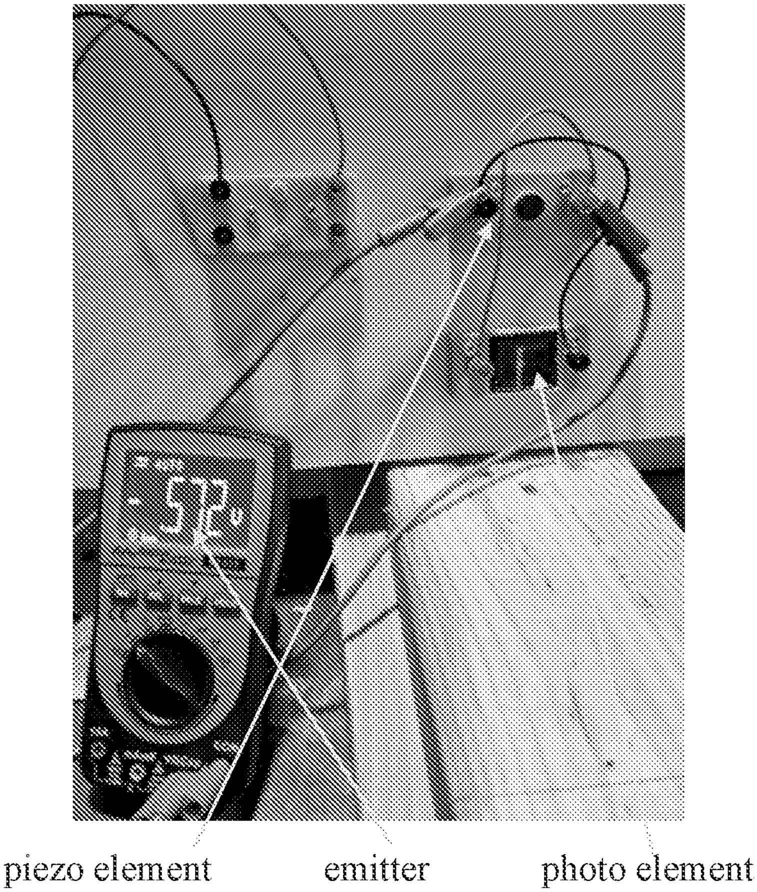

FIGS. 18A-B shows the Virto-Pro device without a receiver, which comprises a Laser (i.e., the photon source), two polarized filters, a diffraction grating with two slits, a diverging lens for creating a parallel photon beam, two panels, and a wall with a hole.

Figure 19:
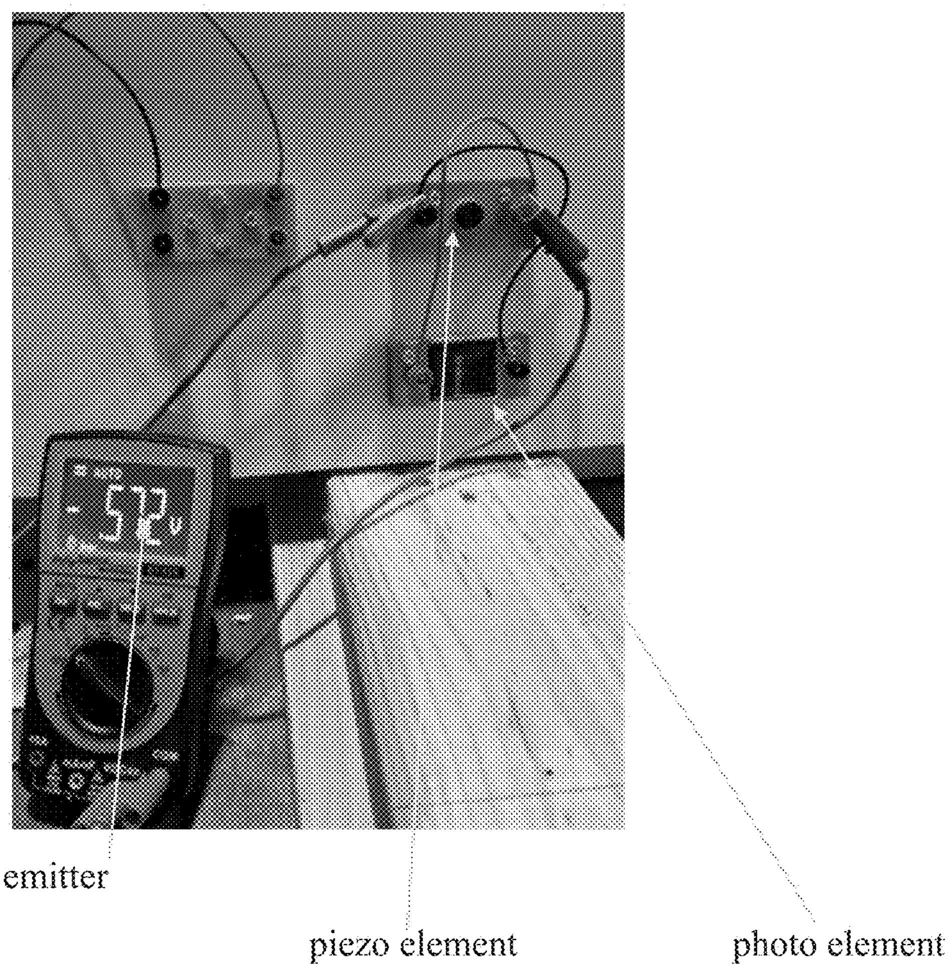
FIG. 19 shows a receiver-antenna comprising a photo element, a piezo element, and an emitter for detecting voltage changes in the output of the device.

FIG. 19 shows a receiver-antenna comprising a photo element, a piezo element, and an emitter for detecting voltage changes in the output of the device.

Figure 20:
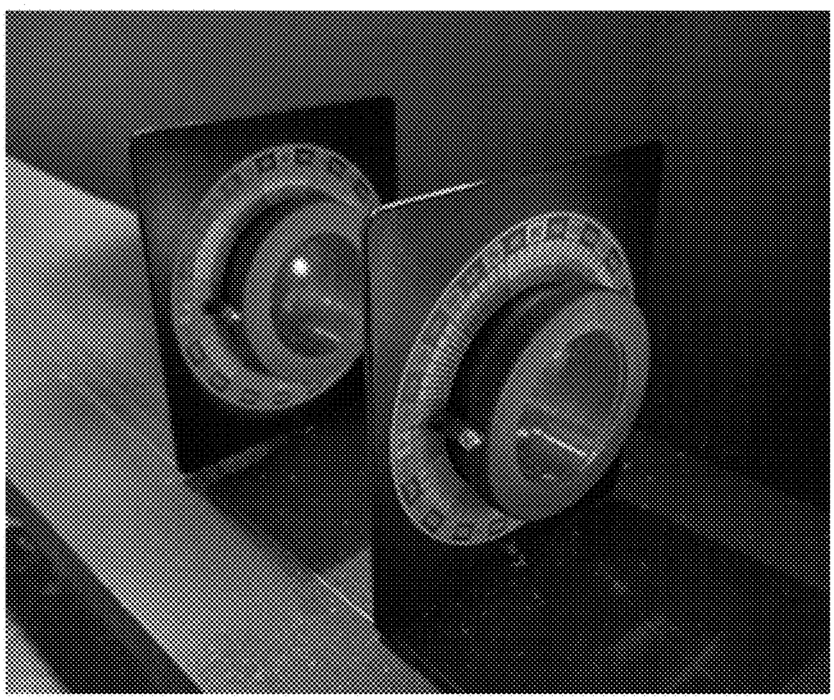
FIG. 20 shows the two polarized filters for signal coding.

FIG. 20 shows the two polarized filters for signal coding.

Figure 21:
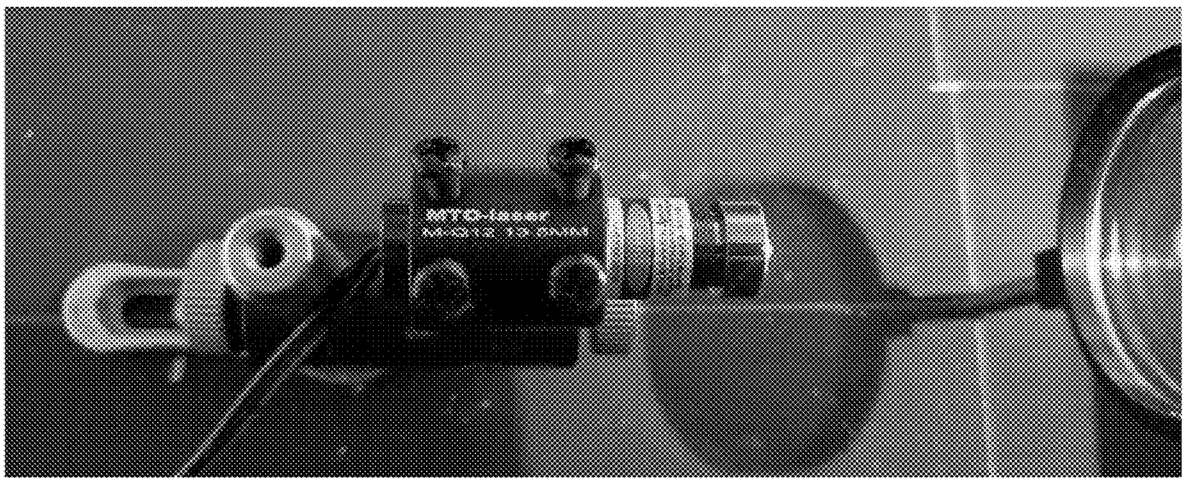
FIG. 21 shows the Laser element of the present invention.

FIG. 21 shows the Laser element of the present invention.

Figure 22:
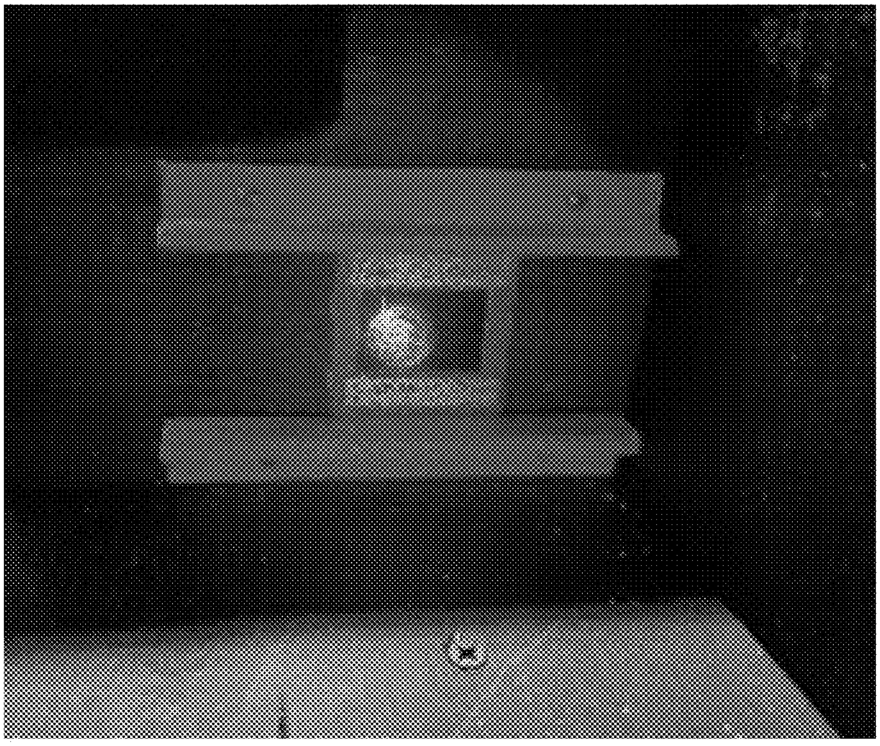
FIG. 22 shows the diaphragm with Double Slits that are spaced 0.25 mm apart.

FIG. 22 shows the diaphragm with Double Slits that are spaced 0.25 mm apart.

Figure 23:
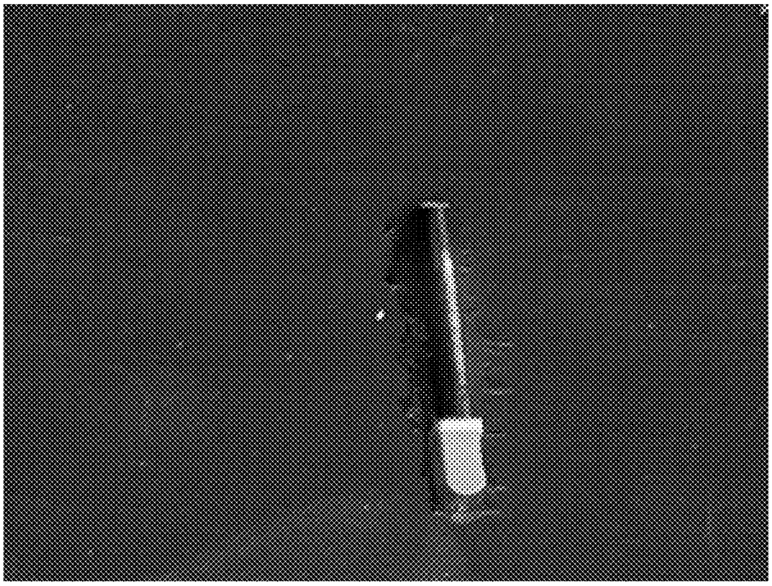
FIG. 23 shows the wall with a hole.

FIG. 23 shows the wall with a hole.

Figure 24:
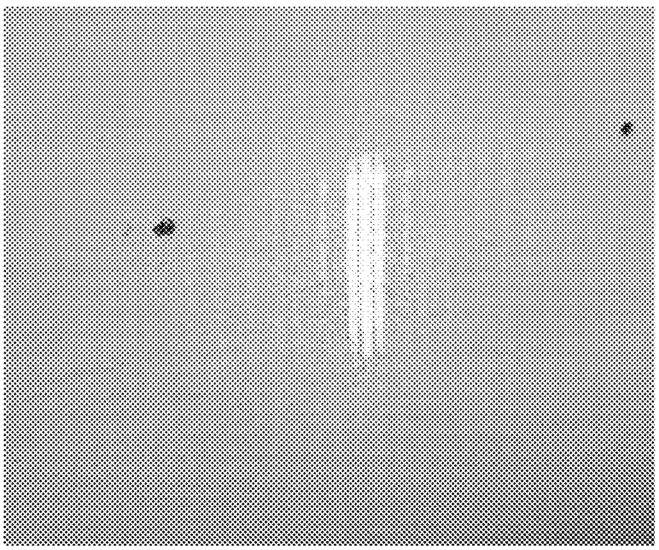
FIG. 24 shows the diffraction pattern after a single photon passed through two holes.

FIG. 24 shows the diffraction pattern after a single photon passes through two holes.

Device Operation

When a single photon is emitted by a laser, the photon passes through the polaroid filters at the speed of light, and passes through two slits and splits itself into two states after encountering the two slits, it instantly creates a discrete set of spin combinations (virtual photons) from the two slits to the receiver antenna. By modifying the angle of the polarization vector on one of the polarization filters, the intensity of the glow at discrete points can be changed. This change in intensity can be translated into a change in voltage and is already interpreted as an audio signal or a video signal and/or a binary signal of zeroes and ones in computer. Therefore, signal transmission from two slots to the receiver will be instantaneous.

The prior art and the existing understanding and the mathematical modeling of the two slits experiment have to date not been completed and the partial modeling is wrong. The present invention contemplates and has successfully transmitted a signal from point A to point B instantly. The two slits of the experiment and a single photon have created two coherent photons and as a result of an interaction between the two coherent photons, they have produced one virtual photon. The shape of the virtual photon is not one coordinate in space. The shape of the virtual photons occupies infinitely discrete coordinates in space. (See. Solution of two state problem in Quantum Mechanic).

This means that the virtual photon will reach the receiver after a diffraction pattern instantly. Accordingly, the present invention manipulates a photon from a laser to generate a virtual photon that will transmit this manipulated photon to receiver instantly.

The prior art has failed to correctly interpret the two slit experiment and the mathematical description of the experiment has not been completed. To the extent that the mathematical description has been done, the analysis is wrong because the photons after transmission from source are not coherent (identical) and the interaction between incoherent particles is not possible. In contrast, the present invention allows for the instant transmission of virtual photons as a result of interaction between two coherent signals using the two slit diffraction pattern and a single photon.

The approach regarding the transmission of signals from point A to point B as disclosed herein is completely different from any methodology in the prior art. In an embodiment, the present invention uses polaroid filters for decoding photons emitted from a laser by changing the angle between the polaroid filters which subsequently changes the intensity of the laser. A single photon in space is moving with the speed of light approximately C=299 792 458 m/s.

This means from point A to point B a single photon will propagandize with a delay time of $t=S/C$ where S distance between point A and point B. As shown in the mathematically derived definition of virtual photons, and because of interaction between a pair of coherent (identical) photons, virtual photons are produced, and each virtual photon will occupy infinitely discrete coordinate space. The virtual photon does not move in space. The distance between point A and point B for virtual photons is equal to zero (0).

Accordingly, in an embodiment, the present invention relates to A method of creating virtual photons, the method comprising:

procuring a laser and shooting an incident laser beam at a target, wherein said target comprises at least one polarizing filter, adjusting an angle of the at least one polarizing filter to decrease an intensity of the incident laser beam after the laser beam passes through the at least one polarizing filter to generate a refractory laser beam, wherein the decrease in the intensity of the incident laser beam to the refractory laser beam generates at least one virtual photon.

In a variation, the method of creating virtual photons includes using a hydrogen gas or a helium gas. In a variation, the refractory laser beam passes through the hydrogen or helium gas.

In a variation, the laser is a gas laser, a dye laser, a solid-state laser, a fiber laser, a liquid laser or a semiconductor laser. In a variation, the laser is a class 2, a class 3R, a class 3B or a class 4 laser. In a variation, the angle of the at least one polarizing filter is between about 10 degrees to 170 degrees relative to the incident laser beam. In a variation, the angle is between about 30 degrees to 150 degrees relative to the incident laser beam. In a variation, the angle is between about 60 degrees to 120 degrees relative to the incident laser beam. In a variation, the angle is between about 75 degrees to 115 degrees relative to the incident laser beam. In a variation, the angle is between about 85 degrees to 100 degrees relative to the incident laser beam. In a variation, the angle is between about 85 degrees to 95 degrees relative to the incident laser beam.

In an embodiment, the present invention relates to a method of generating instantaneous communication from a point A to a point B by use of virtual photons, the method comprising: procuring a laser and shooting an incident laser beam at a target, wherein said target comprises at least one polarizing filter, adjusting an angle of the at least one polarizing filter to decrease an intensity of the incident laser beam after the laser beam passes through the at least one polarizing filter to generate a refractory laser beam, wherein the decrease in the intensity of the incident laser beam to the refractory laser beam generates at least one virtual photon, and using the at least one virtual photon to carry a communication signal from the point A to the point B, thereby generating instantaneous communication.

In a variation, the method of generating instantaneous communication from a point A to a point B by use of virtual photons includes using a hydrogen gas or a helium gas. In a variation of this method, the refractory laser beam passes through the hydrogen or helium gas.

In a variation of the method of generating instantaneous communication from point A to point B by use of virtual photons, the laser is a gas laser, a dye laser, a solid-state laser, a fiber laser, a liquid laser or a semiconductor laser. In a variation, the laser is a class 2, a class 3R, a class 3B or a class 4 laser. In a variation, the angle of the at least one polarizing filter is between about 10 degrees to 170 degrees relative to the incident laser beam. In a variation, the angle is between about 30 degrees to 150 degrees relative to the incident laser beam. In a variation, the angle is between about 60 degrees to 120 degrees relative to the incident laser beam. In a variation, the angle is between about 75 degrees to 115 degrees relative to the incident laser beam. In a variation, the angle is between about 85 degrees to 100 degrees relative to the incident laser beam. In a variation, the angle is between about 85 degrees to 95 degrees relative to the incident laser beam.

It should be understood, and it is contemplated and within the scope of the present invention that any feature that is enumerated above can be combined with any other feature that is enumerated above as long as those features are not incompatible. Whenever ranges are mentioned, any real number that fits within the range of that range is contemplated as an endpoint to generate subranges. In any event, the invention is defined by the below claims.

I claim:

1. A method of creating at least one virtual photon, the method comprising:

activating a laser to generate a laser beam directed at a target, the laser beam, prior to reaching the target, passing through the two polarizing filters and a diffraction grating, and subsequent to the laser beam passing through the two polarizing filters, the laser beam strikes the diffraction grating, wherein the laser beam striking the diffraction grating causes photons of the laser beam to split into two coherent quantum energy states, whose interaction creates at least one virtual photo.

2. The method of claim 1, wherein the method of generating at least one virtual photon using the diffraction grating and changing an angle of at least one of the two polarizing filters to encode the photon enables instantaneous signal transmission from the diffraction grating to the receiving antenna.

3. The method of claim 1, wherein the laser is a gas laser, a dye laser, a solid-state laser, a fiber laser, a liquid laser, or a semiconductor laser.

4. The method of claim 3, wherein the diffraction grating comprises two slits.

5. The method of claim 1, wherein the angle of the at least one of the two polarizing filters has been adjusted between about 0 degrees to 90 degrees.

6. A method of generating instantaneous communication from a point A to a point B by use of at least one virtual photon, the method comprising: using a laser to direct a laser beam at a target, wherein two polarization filters and a diffraction grating are positioned between the laser and the target and wherein an angle of the at least one of the two polarization filters is adjustable;

wherein when the laser beam is passed through the two polarization filters towards a diffraction grating, and as a result of the laser beam passing through the diffraction grating, photons of the laser beam are split into two coherent quantum energy states, an interaction of which generates the at least one virtual photon, and wherein the at least one virtual photon enables instantaneous transmission of a message signal from point A to point B.

7. The method of claim 6, wherein the laser is a gas laser, a dye laser, a solid-state laser, a fiber laser, a liquid laser, or a semiconductor laser.

8. The method of claim 6, wherein the angle of the at least one of the two polarizing filters has been adjusted between about 0 degrees to 90 degrees.

9. A method of creating at least one virtual photon, the method comprising the steps of:

utilizing a laser, two polarizing filters, a diffraction grating, and a receiving antenna comprising a photo element and an emitter for detecting voltage changes, wherein the two polarizing filters are positioned between the laser and the diffraction grating, and activating the laser to cause a laser beam to be emitted from the laser and pass through the two polarizing filters; and causing, subsequent to the laser beam passing through the two polarizing filters, the laser beam to strike the diffraction grating, wherein the laser beam striking the diffraction grating causes photons of the laser beam to split into two coherent quantum energy states, whose interaction creates at least one virtual photon.

10. The method of claim 9 further comprising the step of:

rotating a first polarizing filter of the two polarizing filters forty-five degrees with respect to a second polarizing filter of the two polarizing filters.

11. The method of claim 9 further comprising the step of:

contacting the receiving antenna with the at least one virtual photon.

* * * * *